(12) United States Patent
Davidson

(10) Patent No.: US 12,172,258 B2
(45) Date of Patent: Dec. 24, 2024

(54) BLOCKING TOOL

(71) Applicant: Colten D Davidson, Antigo, WI (US)

(72) Inventor: Colten D Davidson, Antigo, WI (US)

( * ) Notice: Subject to any disclaimer, the term of this patent is extended or adjusted under 35 U.S.C. 154(b) by 912 days.

(21) Appl. No.: 17/156,712

(22) Filed: Jan. 25, 2021

(65) Prior Publication Data
US 2022/0234154 A1 Jul. 28, 2022

(51) Int. Cl.
*B23Q 3/08* (2006.01)

(52) U.S. Cl.
CPC .................................. *B23Q 3/086* (2013.01)

(58) Field of Classification Search
CPC ...... B24D 15/04; B24D 15/023; B24D 15/02; B08B 1/165; B08B 1/00; B08B 1/30; B08B 9/0557
See application file for complete search history.

(56) References Cited

U.S. PATENT DOCUMENTS

| | | | |
|---|---|---|---|
| 2,214,515 A | 9/1940 | Vanderveer et al. | |
| 4,384,382 A * | 5/1983 | Diamant | A46D 1/00 15/247 |
| 4,918,875 A * | 4/1990 | Klocke | B24D 15/023 451/502 |
| 7,048,618 B1 * | 5/2006 | Cramer | B24D 15/023 451/525 |
| 7,229,346 B1 * | 6/2007 | Minker | A47L 13/18 451/526 |
| 7,297,049 B2 * | 11/2007 | Pontieri | B23D 61/185 451/523 |
| 8,057,286 B2 | 11/2011 | Walsh | |
| 8,079,373 B2 * | 12/2011 | Wyatt | A46B 11/002 132/218 |
| 8,689,808 B2 * | 4/2014 | Gueret | A45D 40/267 132/218 |
| 9,532,642 B2 * | 1/2017 | Zech | A46B 3/005 |
| 10,245,707 B2 | 4/2019 | Ryan et al. | |
| 2017/0320194 A1 * | 11/2017 | Ryan | B24D 15/04 |

OTHER PUBLICATIONS

KMS Tools, AFS Flexible Sanding Block: A sanding block for perfect fenders!, published Apr. 9, 2012 at https://www.kmstools.com/blog/afs-flexible-sanding-block-sanding-block-perfect-fenders/, 4 pages filed herewith.

SMSDISTRIBUTORS, Soft-Sanders 16" Block Set, 0704, published on or before Jan. 24, 2021 at https://www.smsdistributors.com/products/soft-sanders-flexible-foam-16-inch-multi-block-sanding-boards-style-line, 4 pages filed herewith.

Finishing Focus, Dura-Block 11" Tubular Sanding Block, AF4404, published on or before Jan. 24, 2021 (web link included in attachment), 5 pages filed herewith.

* cited by examiner

*Primary Examiner* — Joel D Crandall
(74) *Attorney, Agent, or Firm* — Amundsen Davis, LLC

(57) ABSTRACT

A blocking tool and a method of using the blocking tool to sand a surface of a vehicle are disclosed. The blocking tool includes a first member having a length and having an outer periphery with a plurality of cuts formed therein. The plurality of cuts extend over at least about 70% of the length and each of the cuts penetrates the first member through an arc of at least about 70% of the outer periphery. The blocking tool also has a base member with a first surface, an oppositely aligned second surface, and a length. A portion of the outer periphery of the first member is secured to the first surface of the base member to form an integral blocking tool.

20 Claims, 5 Drawing Sheets

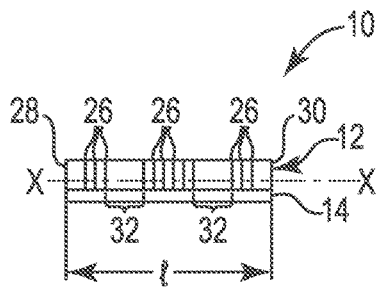 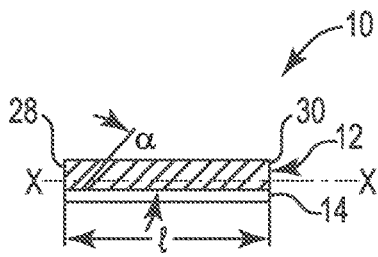 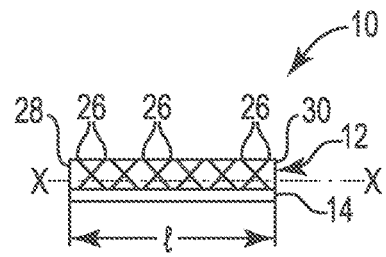
Fig. 12  Fig. 13  Fig. 14
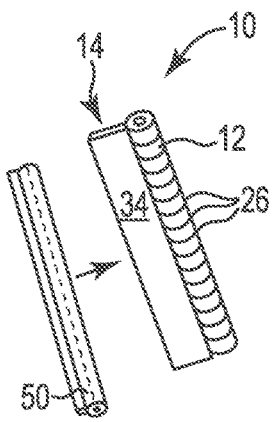 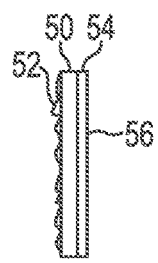 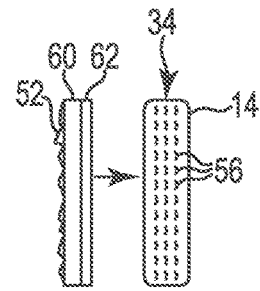
Fig. 15  Fig. 16  Fig. 17
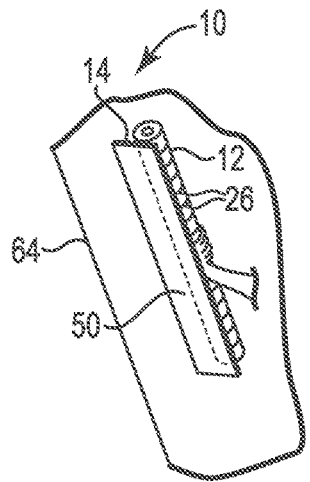 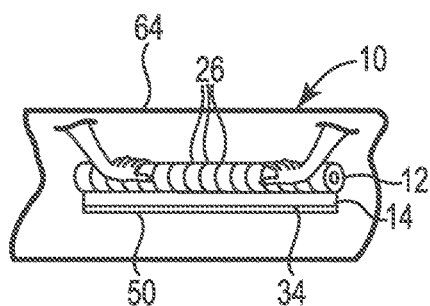
Fig. 18  Fig. 19

BLOCKING TOOL

FIELD OF THE INVENTION

This invention relates to a set of blocking tools each having a different degree of flex and each designed to have a strip of sandpaper secured to its lower surface such that each blocking tool can be moved in a desired motion to sand a work surface, such as the exterior surface of a vehicle. Each blocking tool includes a hollow member containing one or more cuts, and a base member which is secured to the hollow member. The one or more cuts formed in the hollow member alter the flexibility of the blocking tool so that it can be used to sand both flat surfaces and contoured surfaces.

BACKGROUND OF THE INVENTION

Today, there are many vehicles on our roads. These vehicles come in a variety of sizes, shapes and models. These vehicles include: various size automobiles, minivans, sport cars, sport utility vehicles (SUV's), pickup trucks, small size trucks, medium size trucks, large trucks, buses, etc. It is common for accidents to occur over the life of a vehicle. An accident can involve going off the road, hitting another vehicle, hitting a person, hitting an animal, such as a deer, hitting a guard rail, hitting a signpost, or hitting some other stationary object. During inclement weather, such as driving in a wind, rain, snow or ice storm, or driving after a storm, the roads can become treacherous. Slippery roads, wet road and snow covered roads increase the distance a vehicle must travel before it can come to a complete stop. In addition, some vehicles are driven my young drivers who may have little or no experience with driving in bad weather conditions or they may be distracted by loud music or by texting a message on their smart phone. Older adults may suffer from poor eyesight and/or experience a loss of hearing which can cause them to become involved in an accident. Furthermore, some commercial drivers log a great deal of miles and they tend to encounter a plethora of situations where they need to react quickly to avoid an accident. However, all accidents cannot be avoided. After an accident, many vehicles are sent to a body shop for repair. It may be a simply fender bender or it may require extensive body work to the exterior surface of the vehicle.

In fixing one or more of the exterior panels or surfaces on a vehicle, different kinds of commercially available molding compounds, body fillers, fiberglass compounds, etc. can be utilized. Most of these compounds and fillers are applied in a semi-solid state (such as a paste) and are then allowed to dry over time. It is common for a body shop mechanic to sand the dried surface of the compound or filler to make the surface smooth and/or feather the dried compound or filler into the metal or fiberglass of the exterior surface of the vehicle once the compound has completely dried. This sanding is normally done before the vehicle is primed and painted.

A vehicle can have various contours formed on its exterior surface. Some surfaces are flat or planar, while other surface may be convex or concave. Still other surfaces may contain a lip, an indentation or a sharp contour. When sanding these various surfaces, a body shop mechanic will usually use different shape sanding blocks, each containing a strip of sandpaper secured to it. The unique shape of each sanding block allows the body shop mechanic to smooth out a planar surface, a convex surface, a concave surface, etc. However, many such sanding blocks are relatively rigid and do not provide the degree of flexibility required to obtain a smooth surface as the work surface transitions into a different contour.

Now, a set of blocking tools has been invented which have the flexibility to allows a body shop mechanic to sand various surfaces without gouging or scratching the work surface of the vehicle. A method of using the blocking tool is also disclosed.

SUMMARY OF THE INVENTION

Briefly, this invention relates to a set of blocking tools, where each blocking tool contains a certain degree of flex so as to allow a body shop mechanic to sand a dried molding compound, a body filler or a fiberglass compound which has been applied to an external surface of a vehicle without gouging or scratching the work surface. Each blocking tool includes a first member having a length and an outer periphery. The first member has one or more cuts formed therein which extend over at least about 70% of the length of the blocking tool. Each of the one or more cuts penetrates the outer periphery through an arc of at least about 70% of the outer periphery. Each blocking tool also includes a base member having a first surface, an oppositely aligned second surface, and a length. A portion of the wall of the first member is secured to the first surface of the base member to form an integral blocking tool.

In another embodiment, a blocking tool is taught which includes a hollow member having a length. The hollow member also has an inner periphery, an outer periphery, and a wall formed between the inner and outer peripheries. The hollow member has a plurality of cuts formed therein which extend over at least about 75% of the length. Each of the plurality of cuts penetrates the wall through an arc of at least about 60% of the outer periphery. The blocking tool also includes a base member having a length and a width, the length is equal to the length of the hollow member and the width is greater than the outer periphery of the hollow member. The base member has a first surface and an oppositely aligned second surface, and a portion of the wall of the hollow member is secured to the first surface of the base member to form an integral blocking tool.

A method of using a blocking tool is also disclosed. The blocking tool includes a hollow cylindrical member having a length, an inner periphery, an outer periphery, and a wall formed between the inner and outer peripheries. The hollow cylindrical member also has a plurality of cuts formed therein which extend over at least about 70% of the length. Each of the plurality of cuts penetrates the wall through an arc of at least about 60% of the outer periphery. The blocking tool further includes a base member having a length and a width. The length of the base member is equal to the length of the hollow cylindrical member and the width of the base member is greater than the outer periphery of the hollow cylindrical member. The base member has a first surface and an oppositely aligned second surface, and a portion of the wall of the hollow cylindrical member is secured to the first surface of the base member. The method includes the steps of attaching a strip of sandpaper to the second surface of the base member. The hollow cylindrical member is then grasped in the hand of a person. The person can be a body shop mechanic. The person's hand has a thumb and four fingers, and the thumb is positioned on one side of the hollow cylindrical member and at least two of the fingers are positioned on an opposite side of the hollow cylindrical member. The blocking tool is then positioned on a work surface with the sandpaper contacting the work surface which needs to be made smooth. Lastly, the blocking tool is moved in a desired motion by the person to sand the work surface.

The general object of this invention is to provide a set of blocking tools where each blocking tool has a strip of sandpaper secured to its lower surface and each blocking tool has a different degree of flex in order to sand various configured work surfaces without gouging or scratching such work surfaces. A more specific object of this invention is to provide a set of blocking tools wherein each blocking tool has a different degree of flex, so as to allow a person to sand various contour surfaces of a vehicle.

Another object of this invention is to provide a blocking tool which is inexpensive to manufacture.

A further object of this invention is to provide a blocking tool which is comfortable to use and can be moved in a desired motion using one hand or two hands.

Still another object of this invention is to provide a set of blocking tools, each blocking tool having a different degree of flex and each having a different length.

Still further, an object of this invention is to provide a method of using a blocking tool.

Other objects and advantages of the present invention will become more apparent to those skilled in the art in view of the following description and the accompanying drawings.

BRIEF DESCRIPTION OF THE DRAWINGS

FIG. 12 is a side view of a further embodiment of a blocking tool showing a hollow cylindrical member with the cuts crisscrossing one another.

FIG. 13 is a perspective view of a second embodiment of a blocking tool showing an intermediate number of cuts formed along the length of the hollow cylindrical member which provide a greater degree of flexibility.

FIG. 14 is a perspective view of a third embodiment of a blocking tool showing a large number of cuts formed along the length of the hollow cylindrical member which provide for an even greater degree of flexibility.

FIG. 15 is an exploded view of the blocking tool shown in FIG. 1 along with a strip of sandpaper which can be secured to the base member.

FIG. 16 is a side view of a strip of sandpaper having an adhesive backing temporarily covered by a removable peel strip.

FIG. 17 is an exploded view depicting the lower surface of the base member of the blocking tool having a hook material secured thereto and a strip of sandpaper having a backing layer which is a loop material.

FIG. 18 is a perspective view of a blocking tool being grasped by a single hand.

FIG. 19 is a perspective view of a blocking tool being grasped by two hands.

DETAILED DESCRIPTION OF THE INVENTION

Referring to FIGS. 1-5, a blocking tool 10 is shown which is designed to have a strip of sandpaper secured to its lower surface such that the blocking tool 10 can be moved back and forth, be moved in a circular manner, be reciprocated, or be moved in some other fashion to sand a working surface, for example, the exterior surface of a vehicle. The blocking tool 10 is designed to be sold as a set of blocking tools each having a different degree of flex. A set of blocking tool 10 can consist of two or more blocking tools 10, 10.

Vehicles that have been damaged in an accident can undergo body work in a body shop by a body shop mechanic. By "body shop" it is meant a shop or garage where the bodies of automotive vehicles are repaired. When repairing the exterior surface of a vehicle or a portion of the exterior surface of a vehicle, a molding compound, a body filler or a fiberglass compound can be applied to cover dents, holes and surface damage. The molding compound, the body filler or fiberglass compound is allowed to set and dry. After the molding compound, the body filler or the fiberglass compound has dried, it is sanded to make the work surface smooth and to match the remaining exterior metal or fiberglass surface from which the vehicle is constructed.

Figure 1:
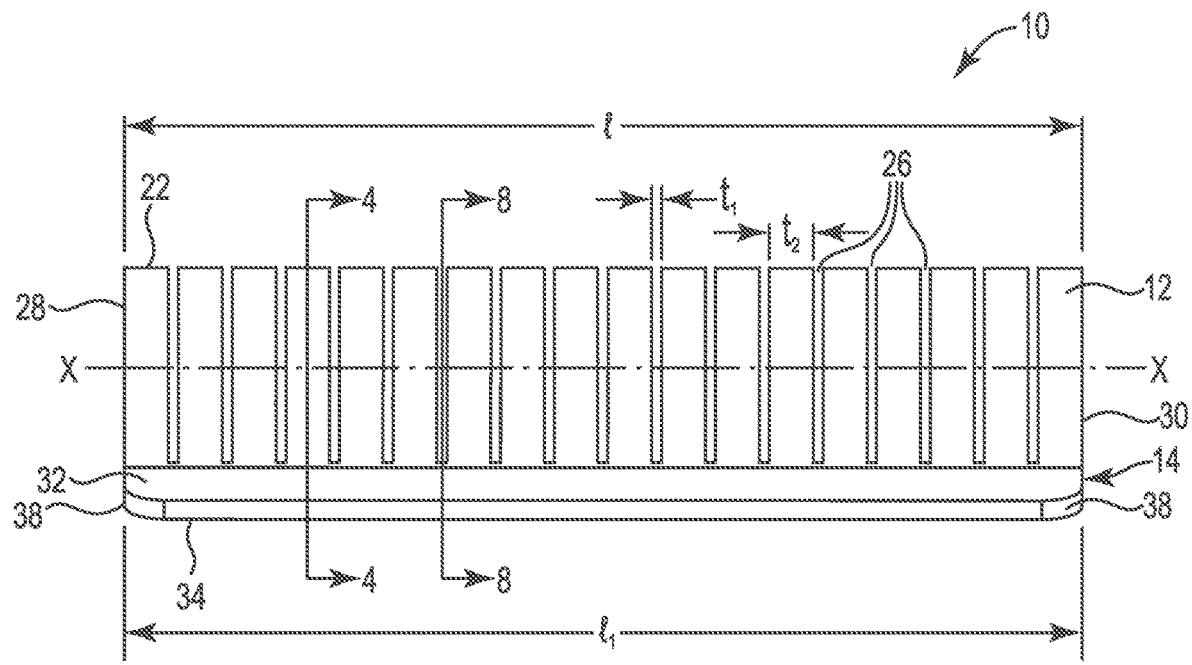
FIG. 1 is a perspective view of a blocking tool having a plurality of cuts formed in the first member, with the plurality of cuts evenly spaced throughout the length of the blocking tool.
Figure 4:
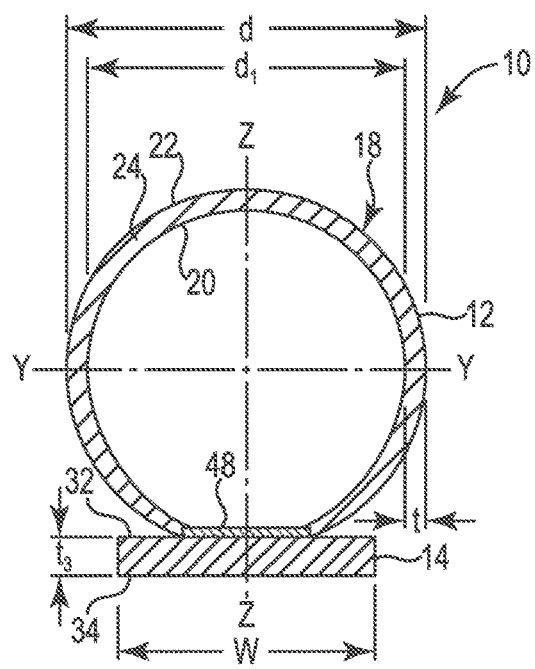
FIG. 4 is a cross-sectional view of the blocking tool shown in FIG. 1 taken along line 4-4.

The blocking tool 10 has a longitudinal axis X-X, a vertical axis Y-Y, and a transverse axis Z-Z (see FIGS. 1 and 4).

The blocking tool 10 can be formed from various materials known to those skilled in the art. Such materials include but are not limited to: plastics, thermoplastics, polymers, acrylics, polycarbonate, polyethylene, polypropylene, combinations thereof, as well as from composite materials. Desirably, each blocking tool 10 is formed from a plastic material, a thermoplastic material or from polycarbonate. Some specific kinds of materials from which each blocking tool 10 can be constructed include but are not limited to: acrylonitrile butadiene styrene, chlorinated poly vinyl chloride, a cross-linked polyethylene, polycarbonate, polyethylene and polypropylene. Acrylonitrile butadiene styrene (ABS) is a common thermoplastic polymer. ABS is made by polymerizing styrene and acrylonitrile in the presence of polybutadiene. The nitrile groups attract each other and bind the chains together, making ABS stronger than pure polystyrene. Chlorinated poly vinyl chloride (CPVC) is a strong and rigid thermoplastic material that is used for hot and cold potable water applications in residential construction. Because of its makeup, CPVC is immune to damage from highly chlorinated domestic water and has a higher temperature tolerance than polyvinyl chloride (PVC). CPVC is corrosion-resistant. Cross-linked polyethylene (PEX) is a flexible plastic material made from medium or high-density polyethylene. PEX piping has been used in hot- and cold-water distribution systems and for hydronic radiant heating in Europe for decades. Introduced into the U.S. in the 1980s, PEX is the most widely used flexible piping for plumbing and radiant floor heating applications. Due to its flexibility, it's often a popular choice for remodels because it can be easily snaked through the walls. PEX tubing is recognized as acceptable for water distribution piping in all major model plumbing codes. PC or Polycarbonate (PC) is a naturally transparent amorphous thermoplastic. The raw material allows for the internal transmission of light nearly at the same capacity as glass. Polycarbonate polymers are used to produce a variety of materials and are particularly useful when impact resistance and/or transparency are a product requirement. Polycarbonate also has very good heat resistance and can be combined with flame retardant materials without significant material degradation. Polyethylene (PE) is a polymerized ethylene resin commonly used to make are kinds of items. Polypropylene (PP) is any of various thermoplastic resins that are polymers of propylene and are used to make molded articles and fibers.

In addition to the above, various polymers can also be used to construct the blocking tool 10. Polymers are any of numerous natural or synthetic compounds of usually high molecular weight consisting of repeated linked units, each a relatively light and simple molecule. In addition, each blocking tool 10 can also be formed from an acrylic. An acrylic is a transparent plastic material with outstanding strength, stiffness, and optical clarity. It has superior wreathing properties compared to many other transparent plastics. An acrylic can be formed from an acrylic resin. By "acrylic resin" it is meant any of numerous thermoplastic polymers of acrylic acid, methacrylic acid, esters of these acids, or acrylonitrile, used especially to produce plastics.

Furthermore, each blocking tool 10 can be formed from a composite. Composites are made up of distinct components; compounds. A composite can be a complex material in which two or more distinct, structurally complementary substances combine to produce structural or functional properties not present in any individual component.

Furthermore, other kinds and types of materials known to those skilled in the art can also be used to form each of the blocking tools 10. These could include carbon fibers, fiberglass, foam, wood and various types of metal or metal alloys.

Each of the blocking tools 10 can be made transparent, if desired. By "transparent" it is meant capable of transmitting light so that objects or images can be seen as if there were no intervening material. Alternatively, each of the blocking tools 10 can be made opaque. By "opaque" it is meant that it is impenetrable by light; neither transparent nor translucent.

Figure 5:
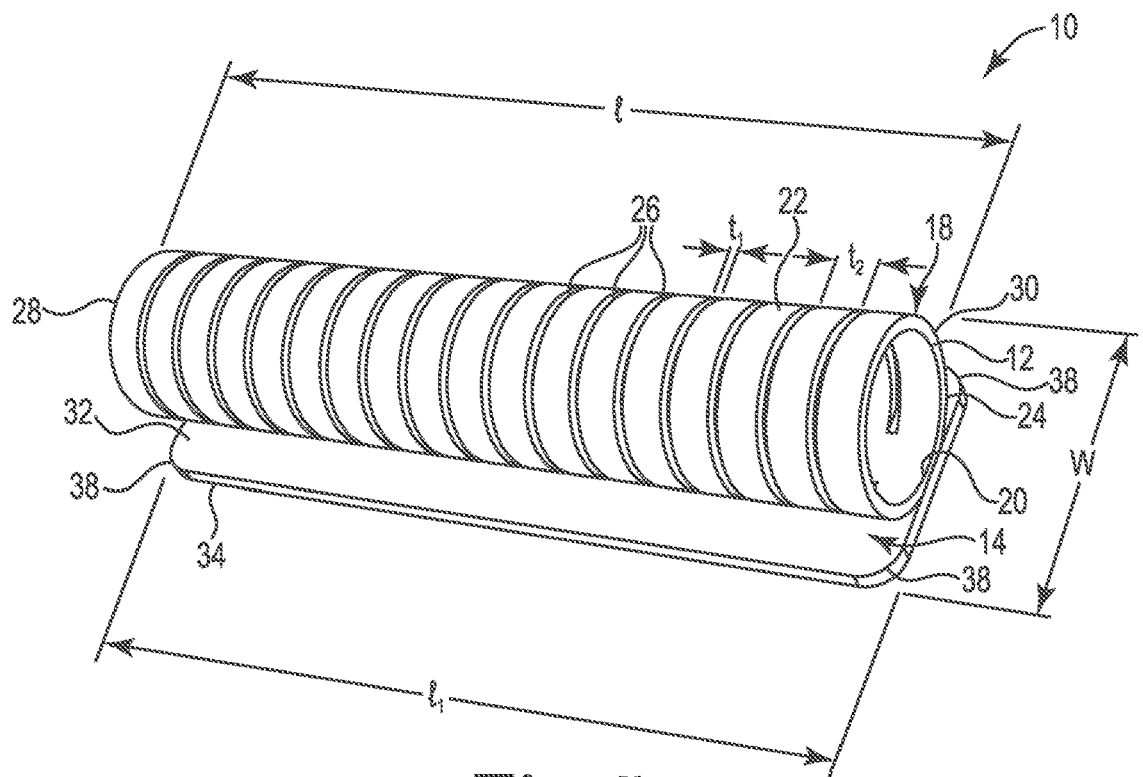
FIG. 5 is a perspective end view taken from a different angle of the blocking tool shown in FIG. 1
Figure 6:
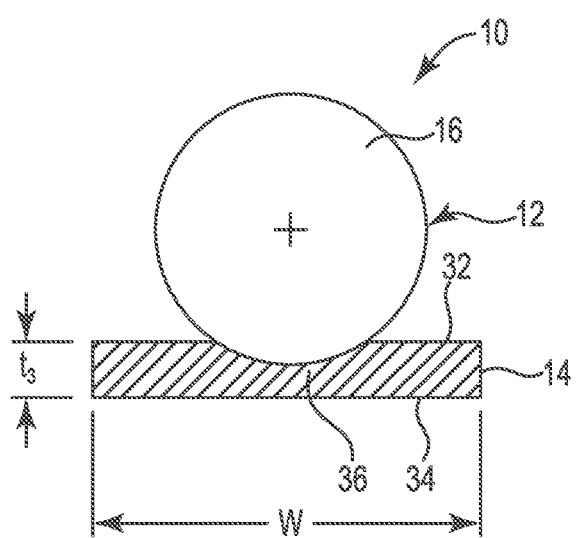
FIG. 6 is an end view of a blocking tool wherein the first member is a solid member.
Figure 7:
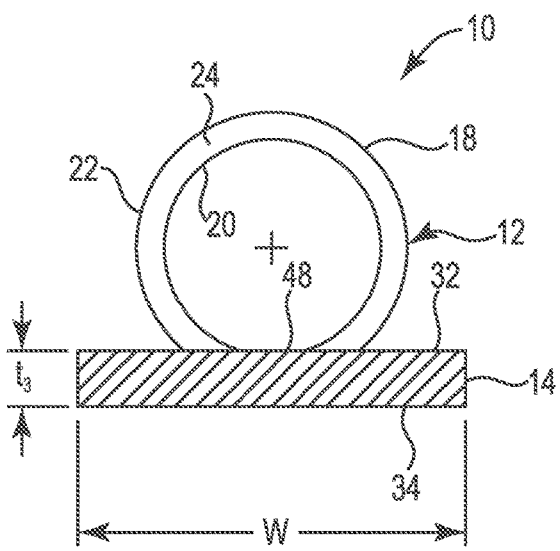
FIG. 7 is an end view of a blocking tool wherein said first member is a hollow member.

Referring to FIGS. 1-7, each of the blocking tools 10 includes a first member 12 secured to a base member 14. Each blocking tool 10 is an integral unit. By "integral" it is meant a complete unit; a whole. The first member 12 can be a solid member 16, as shown in FIG. 6, or it can be a hollow member 18, as is shown in FIG. 7. Desirably, the first member 12 is a hollow member. More desirably, the first member 12 is a hollow cylindrical member.

The first member 12 has a length l. The length l of the first member 12 can vary from a couple of inches up to about 48 inches. The first member 12 can have a length l which ranges from between about 6 inches to about 48 inches. Desirably, the length l of the first member 12 ranges from between about 8 inches to about 36 inches. More desirably, the length l of the first member 12 ranges from between about 10 inches to about 24 inches. Even more desirably, the length l of the first member 12 ranges from between about 12 inches to about 24 inches. Most desirably, the length l of the first member 12 is less than about 30 inches.

Figure 2:
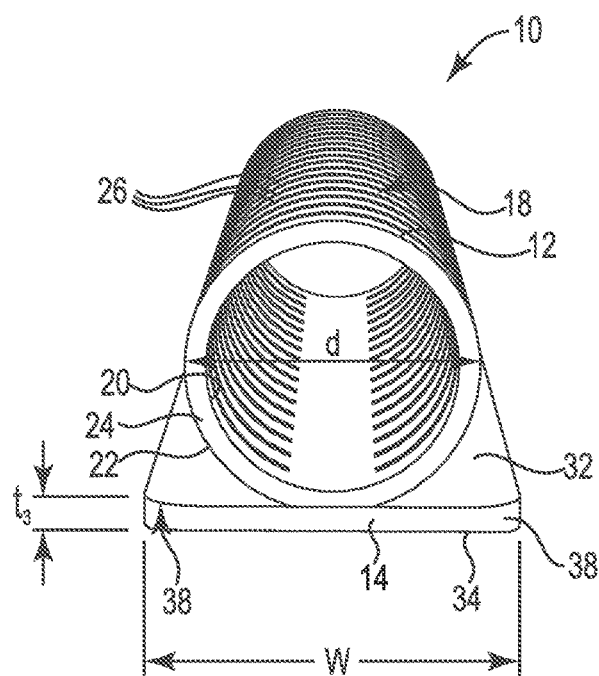
FIG. 2 is a perspective end view of the blocking tool shown in FIG. 1.
Figure 3:
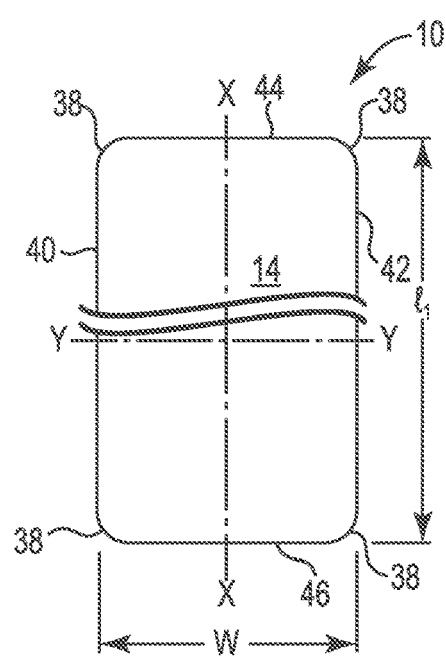
FIG. 3 is a bottom view of the blocking tool shown in FIG. 1.

Referring to FIGS. 2 and 4, when the first member 12 is configured as a hollow member 18, it has an inner periphery 20, an outer periphery 22, and a wall 24 formed between the inner and outer peripheries, 20 and 22 respectively. By "periphery" it is meant a line that forms the boundary of an area. The shape of the hollow member 18 can vary. The hollow member 18 can have a round or circular shape, an oval shape, or have some other geometrical shape. Desirably, the hollow member 18 is a hollow elongated cylinder. The hollow member 18 has an outside diameter d and an inside diameter $d_1$. The outside diameter d of the hollow member 18 can vary. Generally, the outside diameter d of the hollow member 18 can range from between about 0.5 inches to about 4 inches. Desirably, the outside diameter d of the hollow member 18 ranges from between about 0.75 inches to about 3.5 inches. More desirably, the outside diameter d of the hollow member 18 ranges from between about 1 inch to about 3.25 inches. Most desirably, outside diameter d of the hollow member 18 ranges from between about 2 inches to about 3.5 inches.

Still referring to FIG. 4, the inside diameter $d_1$ is smaller than the outside diameter d. The thickness t of the wall 24 can vary. The thickness t of the wall 24 can range from between about 0.5 inches to about 1 inch. Desirably, the thickness t of the wall 24 can range from between about 0.5 inches to about 0.5 inches. More desirably, thickness t of the wall 24 can range from between about 0.5 inches to about 0.3 inches. Even more desirably, thickness t of the wall 24 can range from between about 0.5 inches to about 0.2 inches. Most desirably, thickness t of the wall 24 is less than about 0.15 inches.

Referring again to FIGS. 1, 2, 5, 8 and 9, the first member 12 also has one or more cuts 26 formed therein. By "cut" it is meant a narrow opening. The one or more cuts 26 are formed in the first member 12. Desirably, a plurality of cuts 26 are formed. The one or more cuts 26 can extend over at least a portion of its length l. When a plurality of cuts 26 are formed, they can extend over a portion of the length l or over the entire length l of the first member 12. The one or more cuts 26 provide flexibility to each blocking tool 10. A blocking tool 10 can be constructed such that it is: rigid, semi-flexible, flexible or ultra-flexible. A rigid blocking tool 10 may contain no cuts 26 or only one cut 26. As more cuts 26 are formed in the first member 12, each of the blocking tools 10 becomes more flexible. In addition to the number of cuts 26, the location of the cuts 26, the thickness of each cut 26, the land area existing between each the cuts 26, the pattern of arranging the cuts 26, the uniform or non-uniform arrangement of the cuts 26, and the depth of each cut 26 all determine how flexible a given blocking tool 10 becomes.

The one or more of the cuts 26 or the plurality of cuts 26 can extend over a portion of the length l of the first member 12 or they can extend over the entire length l of the first member 12. Except for a rigid blocking tool 10, the more flexible blocking tools 10 will contain 3 or more cuts and they are herein referred to as having a plurality of cuts 26. The plurality of cuts 26 can be equally spaced apart or be spaced apart at an unequal distance. Desirably, the plurality of cuts 26 will extend over at least about 70% of the length l of the first member 12. More desirably, the plurality of cuts 26 will extend over at least about 75% of the length l of the first member 12. Even more desirably, the plurality of cuts 26 will extend over at least about 80% of the length l of the first member 12. Still more desirably, the plurality of cuts 26 will extend over at least about 85% of the length l of the first member 12. More desirably, the plurality of cuts 26 are equally spaced apart and extend over at least about 90% of the length l of the first member 12. Still more desirably, the plurality of cuts 26 will extend over at least about 95% of the length l of the first member 12. Most desirably, the plurality of cuts 26 are equally spaced apart and extend from about 75% to about 100% of the length l of the first member 12.

The number of cuts 26 can vary and will partially depend on the length l of the first member 12. The number of cuts 26 can range from 1 to about 100 for a 36-inch-long blocking tool 10. Desirably, the number of cuts 26 will be less than about 50 for a 36-inch-long blocking tool 10. More desirably, the number of cuts 26 can range from about 12 to about 50 for a 24-inch-long blocking tool 10. Even more desirably, number of cuts 26 can range from about 16 to about 30 for a 24-inch-long blocking tool 10. Most desirably, the number of cuts 26 will be less than about 18 per foot of length of the blocking tool 10.

It should be understood that if the blocking tool 10 has a non-linear shape, such as a round or circular shape, an arcuate shape, etc., that the number of cuts 26 can be less than, equal to or be more than the number of cuts 26 formed in a linear member. For example, a non-linear shape may need a lesser number of cuts 26 to exhibit the same degree of flexibility present in a linear blocking tool 10.

As mentioned above, as the number of cuts 26 formed along the length l of each of the blocking tools 10 increases, each of the blocking tools 10 will exhibit an increase in the amount of flexibility. One may need a rigid blocking tool 10 for some jobs, a semi-rigid blocking tool 10 for other jobs, a flexible blocking tool 10 for still other jobs, and an ultra-flexible blocking tool 10 for still other jobs. The contour of the work surface which is being sanded will normally dictate what flexibility the blocking tool 10 should exhibit. For example, a planar work surface may require a rigid blocking tool 10, a contoured work surface may require a more flexible blocking tool 10, and a work surface containing a ridge, a crest, an indentation or a groove may require an ultra-flexible blocking tool 10. For this reason, the blocking tool 10 can be manufactured in a variety of shapes, sizes, length and flexibility. A set of blocking tools 10 may be purchased to accommodate most of the work surfaces that one may encounter.

Referring again to FIGS. 1 and 5, each of the one or more cuts 26 has a thickness $t_1$. The thickness $t_1$ of a cut 26 can vary. The thickness $t_1$ of each cut 26 can range from between about 0.01 inches to about 0.1 inches. Desirably, the thickness $t_1$ of each cut 26 can range from between about 0.01 inches to about 0.08 inches. More desirably, the thickness $t_1$ of each cut 26 can range from between about 0.01 inches to about 0.07 inches. Even more desirably, the thickness $t_1$ of each cut 26 can range from between about 0.01 inches to about 0.06 inches. Most desirably, the thickness $t_1$ each cut 26 is less than about 0.05 inches.

It should be noted that when one or more cuts 26 are formed in the first member 12 of a blocking tool 10, that the thickness $t_1$ of each and every cut 26 does not have to be the same. Some cuts 26 can have a greater thickness $t_1$ if desired. Normally, all the cuts 26 will have the same thickness $t_1$.

The one or more cuts 26 can be formed using any equipment and technology known to those skilled in the art. Such equipment and technology includes but is not limited to: knives, saws, hand saws, circular saws, rotary saws, reciprocating knives, a knife blade, water jet cutting, laser cutting, melting of the material using heat and/or pressure, use of chemical, etc.

Still referring to FIGS. 1 and 5, the thickness $t_2$ of the land area located between each of the one or more adjacent cuts 26 can vary. This thickness $t_2$ of the land area can range from between about 0.1 inches to several inches. Desirably, the thickness $t_2$ of the land area will range from between about 0.1 inches to about 4 inches. More desirably, the thickness $t_2$ of the land area will range from between about 0.15 inches to about 2 inches. Even more desirably, the thickness $t_2$ of the land area will range from between about 0.15 inches to about 1.25 inches. Most desirably, the thickness $t_2$ of the land area is less than about 1 inch.

Referring again to FIG. 1, the first member 12 has a first end 28 and a second end 30. Both the first end 28 and the second end 30 are open. Two or more cuts 26 can be evenly spaced over the length l of the first member 12. The plurality of cuts 26 can be uniformly arranged or be non-uniformly (randomly) arranged along the length l of the first member 12. The plurality of cuts 26 can start at the first end 28 of the first member 12 and continue to the second end 30 with a space or land area located therebetween. Alternatively, the plurality of cuts 26 can start inward from the first end 28 and terminate inward from the second end 30. In still another embodiment, one or more of the cuts 26 can be formed anywhere between the first and second ends, 28 and 30 respectively.

Figure 8:
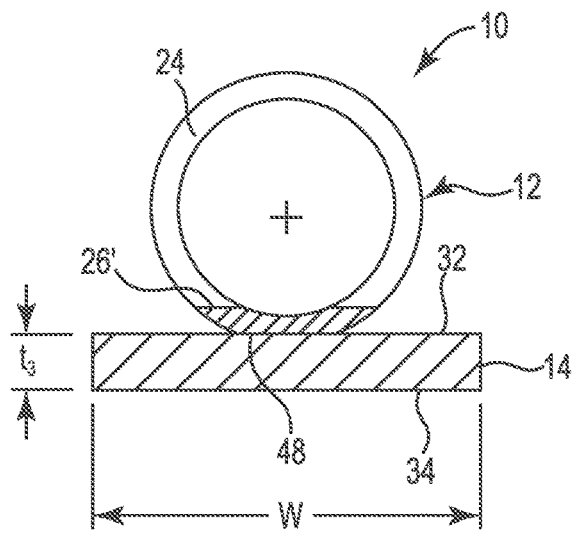
FIG. 8 is cross-sectional view of FIG. 1 taken along line 8-8 showing the cut penetrating though an arc of at least about 90% of the outer periphery of the wall of the hollow cylindrical member.
Figure 9:
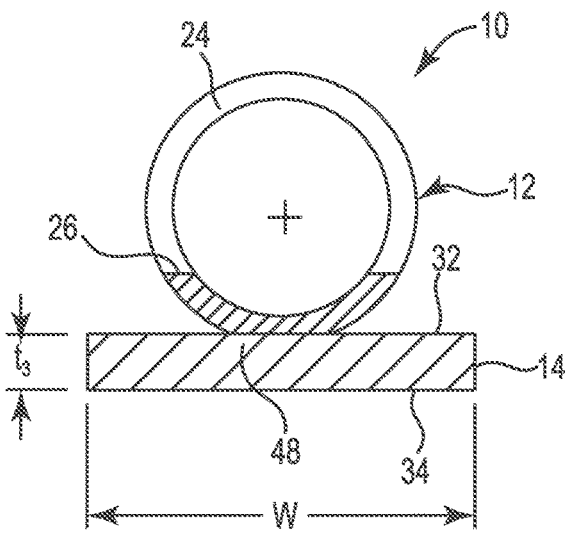
FIG. 9 is an alternative cross-section view to FIG. 8, wherein the cut penetrates through an arc of at least about 70% of the outer periphery of the wall of the hollow cylindrical member.

Referring now to FIGS. 8 and 9, each of the one or more cuts 26 penetrates the wall 24 of the first member 12 through an arc of at least about 60% of the outer periphery 22. Desirably, each of the cuts 26 penetrates the wall 24 of the first member 12 through an arc ranging from between about 65% to about 99%. More desirably, each of the cuts 26 penetrates the wall 24 of the first member 12 through an arc ranging from between about 70% to about 98%. Even more desirably, each of the cuts 26 penetrates the wall 24 of the first member 12 through an arc of at least 75%. Most desirably, each of the cuts 26 penetrates the wall 24 of the first member 12 through an arc ranging from between about 70% to about 90%. In FIG. 8, the cut 26 penetrates the wall 24 of the first member 12 through an arc of at least 85%. In FIG. 9, the cut 26 penetrates the wall 24 of the first member 12 through an arc of at least 60%.

Stated another way, for a first member 12 having an outside diameter d of about 2 inches, each cut 26 can extend to a depth of about 1.2 inches from the outer periphery 22. Desirably, for a first member 12 having an outside diameter d of about 2 inches, each cut 26 can extend to a depth which ranges from between about 1.2 inches to about 1.98 inches from the outer periphery 22. More desirably, for a first member 12 having an outside diameter d of about 2 inches, each cut 26 can extend to a depth which ranges from between about 1.4 inches to about 1.96 inches from the outer periphery 22. Even more desirably, for a first member 12 having an outside diameter d of about 2 inches, each cut 26 can extend to a depth of about 1.5 inches from the outer periphery 22. Most desirably, for a first member 12 having an outside diameter d of about 2 inches, each cut 26 can extend to a depth which ranges from between about 1.4 inches to about 1.8 inches from the outer periphery 22.

It should be understood that each of the cuts 26 could penetrates the wall 24 of the first member 12 through an identical arc. Alternatively, one or more of the cuts 26 could penetrates the wall 24 of the first member 12 through a different arc or through a different number of degrees. For example, a cut 26 could penetrate the wall 24 through an arc of about 60° while another cut 26 could penetrate the wall through an arc of about 80°. In other words, the depth of each of the cuts 26 does not have to be constant, some cuts 26 can be deeper or shallower than others. Desirably, when a plurality of cuts 26 are formed in the first member 12, each of the plurality of cuts 26 will be formed to the same depth.

One advantage of constructing the first member 12 as a hollow member 18 is that less material has to be removed as each of the cuts 26 is made. If the first member 12 is solid, as shown in FIG. 6, more material will have to be removed when making each cut 26. Therefore, a hollow member 18 is more economical to cut.

Figure 10:
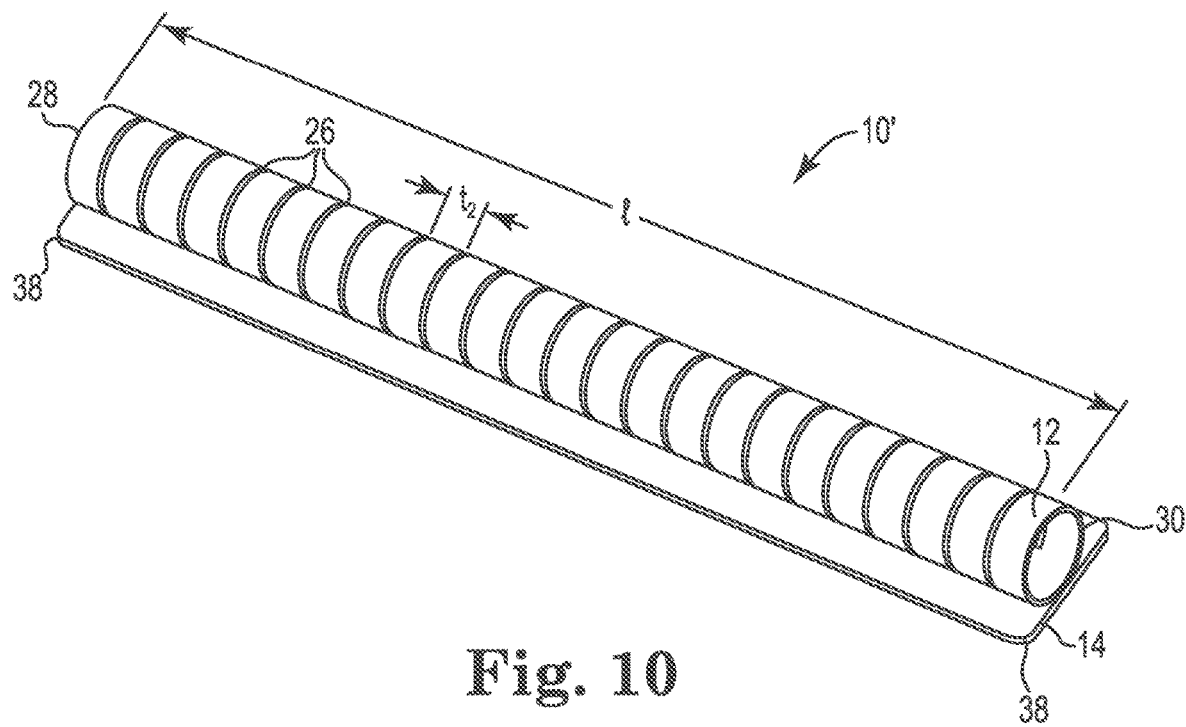
FIG. 10 is an isometric view of another embodiment of a blocking tool showing a hollow cylindrical member with cuts formed in a non-uniform arrangement.
Figure 11:
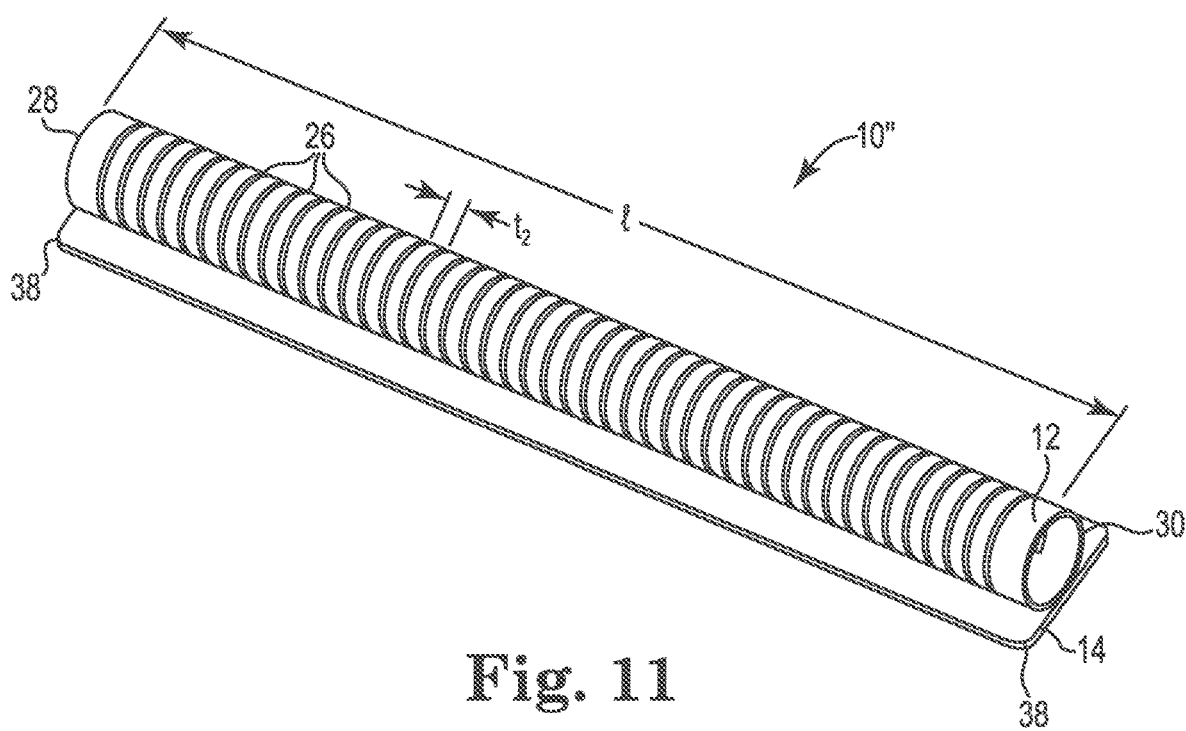
FIG. 11 is an isometric view of still another embodiment of a blocking tool showing a hollow cylindrical member with the cuts formed at an angle to the longitudinal central axis of the hollow cylindrical member.

Referring now to FIGS. 10 and 11, two additional embodiments of a blocking tool 10' and 10" are shown. In FIG. 10, an elongated blocking tool 10' is shown having a plurality of cuts 26 formed over its entire length l. All of the plurality of cuts 26 are evenly and uniformly spaced apart from one another. The plurality of cuts 26 start at the first end 28 and extend to the second end 30. Each of the plurality of cuts 26 are spaced about 0.25 inches apart to create a flexible blocking tool 10'. This means that each land area (space located between two adjacent cuts 26) has a thickness $t_2$. This thickness $t_2$ is about 0.25 inches in FIG. 10. In FIG. 11, another elongated blocking tool 10" is shown having a greater number of plurality of cuts 26 formed over its entire length l. Each of the plurality of cuts 26 is evenly or uniformly spaced apart from one another. The plurality of cuts 26 start at the first end 28 and extend to the second end 30. Each of the plurality of cuts 26 are spaced about 0.12 inches apart to create an ultra-flexible blocking tool 10". This means that the land area (space located between two adjacent cuts 26) has a thickness $t_2$ of 0.12 inches. The blocking tool 10" will exhibit greater flexibility than the blocking tool 10' because it contains a greater number of cuts 26. In addition, the thickness $t_1$ of each of the plurality of cuts 26 and the depth of each of the plurality of cuts 26 are about the same as shown in FIG. 10. Furthermore, the first member 12 in both FIGS. 10 and 11 have the same outside diameter d.

Referring now to FIGS. 12-13, two additional cut patterns are shown. In FIG. 12, the plurality of cuts 26 do not extend from the first end 28 to the second end 30 in a uniform pattern. This means that at least some of the plurality of cuts 26 are spaced at different distances apart from one another. For example, it may be advantageous to eliminate the cuts 26 where a body shop mechanic needs to position his hand or hands. The manufacturer of the blocking tools 10 can vary the placement of the plurality of cuts 26 to suit the desired needs of a particular customer. In FIG. 13, one will observe that each of the plurality of cuts 26 is formed perpendicular, or at a 90° angle, to the longitudinal axis X-X of the blocking tool 10. However, the each of the plurality of cuts 26 can be formed at an angle α to the longitudinal axis X-X of the blocking tool 10, if desired. The degree of the angle α can vary. Desirably, the angle α can range from between about 1° to about 89°. More desirably, the angle α can range from between about 5° to about 60°. Even more desirably, the angle α can range from between about 10° to about 45°. Most desirably, the angle α can range from between about 15° to about 30°. In FIG. 13, the plurality of cuts 26 extend between the first and second ends, 28 and 30 respectively.

Referring now to FIG. 14, still another cut pattern is depicted. In FIG. 14, the plurality of cuts 26 are uniformly spaced apart from one another. In addition, the plurality of cuts 26 are arranged in a crisscrossing pattern. The plurality of cuts 26 extend along the length l of the first member 12 from the first end 28 to the second end 30. By "crisscrossing" it is meant a pattern made by crossing lines. This crisscrossing pattern may add additional flexibility to the blocking tool 10.

It should be understood that various other patterns, envisioned by those skilled in the art, can also be used.

Referring again to FIGS. 1 and 2, the first member 12 can vary in cross-sectional configuration as well as in overall configuration. The first member 12 can be formed with different geometrical cross-sections. For example, the first member 12 can have a round cross-section, an oval cross-section, an elliptical cross-section, a square cross-section, a rectangular cross-section, etc. Furthermore, the outside configuration of the first member 12 can be constructed to provide for ergonomics whereby the design is intended to maximize productivity by reducing operator fatigue and discomfort. For example, a portion of the outer periphery 22 of the first member 12 can have ergonomically spaced indentations to receive a person's thumb and/or fingers. The ergonomical shape can make the blocking tool 10 more comfortable to use over an extended time period.

Referring again to FIGS. 1, 2 and 5, the blocking tool 10 is depicted as a linear member. However, the blocking tool 10 can also vary in configuration and shape. The blocking tool 10 can be constructed in almost any geometrical configuration known to man. For example, besides being straight or linear, the blocking tool 10 could have an arcuate shape, a boomerang shape, a round or circular shape, a square shape, a rectangular shape, a chevron shape (shaped like an inverted V), etc.

Referring again to FIGS. 1-5 and as mentioned above, each of the blocking tools 10 also includes a base member 14. The base member 14 can be constructed of the same material from which the first member 12 is constructed. Alternatively, the base member 14 could be constructed from a different material from which the first member 12 is constructed. The base member 14 has a first surface 32, an oppositely aligned second surface 34, a length $l_1$ and a width w. The length $l_1$ of the base member 14 can be less than, equal to, or be greater than the length l of the first member 12. Desirably, the length $l_1$ of the base member 14 is equal to the length l of the first member 12. The width w of the base member 14 can be less than, equal to, or be greater than the outer diameter d of the first member 12. Desirably, the width w of the base member 14 is greater than the outer diameter d of the first member 12. If the first member 12 is not round, then the width w of the base member 14 should be greater than the widest dimension of the first member 12. The width w of the base member 14 can be greater than the widest dimension of the first member 12 by at least about 0.5 inches. Desirably, the width w of the base member 14 range from about 0.5 to about 2 inches greater than the widest dimension of the first member 12. For example, when the first member 12 is a hollow cylindrical member having a 2 inch outside diameter d, the base member 14 can have a width w of at least about 2.5 inches.

The base member 14 also has a thickness $t_3$ measured as the distance located between the first surface 32 and the second surface 34. The thickness $t_3$ of the base member 14 can vary in dimension. The thickness $t_3$ of the base member 14 can range from between about 0.1 inches to about 1 inch. Desirably, the thickness $t_3$ of the base member 14 can range from between about 0.1 inches to about 0.5 inches. More desirably, the thickness $t_3$ of the base member 14 can range from between about 0.15 inches to about 0.4 inches. Even more desirably, the thickness $t_3$ of the base member 14 can range from between about 0.15 inches to about 0.35 inches. Most desirably, thickness $t_3$ of the base member 14 can be equal to or be less than about 0.3 inches.

Referring again to FIG. 2, the base member 14 can vary in geometrical configuration. In FIG. 2, the base member 14 is depicted as having a rectangular configuration. However, the base member 14 could be formed as a square, an elongated rectangle, an oval, have a round or circular shape, etc. The base member 14 could have almost any geometrical configuration desired. The base member 14 is shown with corners 38 which can be rounded, as shown, or have a radius formed thereon. Alternatively, each corner 38 can be formed at a 90° angle. Rounded corners 38 are more aesthetically pleasing. In FIG. 2, four rounded corners 38, 38, 38 and 38 are depicted.

Side walls, 40 and 42, and end walls, 44 and 46, join the first surface 32 to the second surface 34. The side walls, 40 and 42, and the end walls, 44 and 46, can vary in configuration. The side walls, 40 and 42, and the end walls, 44 and 46, can have a straight vertical profile, have a tapered profile, have a rounded profile, be beveled or be contoured. A straight vertical profile works well. The base member 14 can also be a solid member or a hollow member. A solid member is the most economical to construct.

Referring again to FIGS. 6 and 7, the first surface 32 of the base member 14 can be a flat or planar surface, see FIG. 7, or it can contain a concave surface 36, see FIG. 6. By "concave" it is meant curved like the inner surface of a sphere. Generally, the first surface 32 of the base member 14 is flat or planar. When a concave surface 36 is utilized, it should be sized and shaped to match the arc of the outer periphery 22 of the first member 12. This will allow the first member 12 to be positioned in the concave surface 38 and to be secured thereto. The first member 12 is secured to the first surface 32 of the base member 14. By joining similarly mating surfaces, a strong bond can be accomplished. This is why the flat surface is mated with another flat surface, see FIG. 7, or why a concave surface is formed to mate with a spherical surface, as is shown in FIG. 6.

It should be understood that various other mating surface profiles can also be utilized.

The first member 12 can be secured to the first surface 32 of the base member 14 various means. For example, the first member 12 can be secured to the first surface 32 of the base member 14 by solvent welding, solvent bonding, solvent cementing, be mechanically attached, be chemically attached, be melted and/or pressure bonded together, etc. Other means of securing the first member 12 to the first surface 32 of the base member 14, which are known to those skilled in the art, can also be used. The terms solvent welding, solvent bonding and solvent cementing, are used interchangeably. Solvent welding, bonding or cementing involve a process of joining two or more members together, when the members are made of thermoplastic resins. The process involves applying a solvent capable of softening the surfaces to the two members and pressing the softened surfaces together. The two members are welded or bonded by means of chemical fusion. The solvent soften and dissolve the surfaces to be joined. Once the two surfaces are assembled, a chemical weld occurs. This weld strengthens over time as the solvent evaporate.

When the first member 12 and the base member 14 are formed from ABS, CPVC or PVC, they can be joined easily and quickly by using solvent welding, solvent bonding or solvent cementing.

Referring again to FIGS. 4, 5, 7, 8 and 9, one will notice that a portion of the outer periphery 22 of the first member 12 is flattened or cut off to produce a flat surface 48. This flat surface 48 forms a better contact surface with the flat or planar first surface 32 than an arc could provide. The flat surface 48 of the first member 12 is positioned against the flat surface 32 of the base member 14 and then the two members, 12 and 14 are secured or joined together. The solvent welding, bonding or cementing process produces a strong bond therebetween. The solvent weld, bond or cementing secures the first member 12 to the first surface 32 of the base member 14 and forms an integral blocking tool 10.

Other ways of joining the first member 12 to the base member 14 can also be utilized. These other ways include: a mechanical attachment, such as by the use of screws, pins, wire, etc. When screws are used, countersink holes can be formed in the second surface 34 of the base member 14. One or more screws (not shown) can then be screwed through the thickness $t_3$ of the base member 14 and into the first member 12 to form a secure attachment. In addition, chemical bonds can also be utilized. A chemical bond can use: an adhesive, a co-adhesive, glue, an epoxy, etc. By "epoxy" it is meant any of various thermoplastic resins capable of forming tight cross-linked polymer structures characterized by toughness, strong adhesion, and low shrinkage. Other methods of securing two members together, which are known to those skilled in the art, can also be utilized.

Referring now to FIGS. 15 and 16, the second surface 34 of the base member 14 is designed to have a piece of sandpaper 50 secured to it. By "sandpaper" it is meant heavy paper coated on one side with sand or other abrasive material and used for smoothing surfaces. A strip of the sandpaper 50 can be removed from a supply roll of sandpaper (not shown). Alternatively, the sandpaper 50 can be purchased as individual sheets. In one embodiment, the sandpaper 50 contains sand and/or some other abrasive material 52 on one major surface and an adhesive 54 on an opposite major surface. The adhesive is temporarily covered and protected by a removable peel strip 56. The adhesive 54 can be a medium to high strength adhesive which will secure the strip of sandpaper 50 to the second surface 34 of the blocking tool 10. The adhesive 54 should be strong enough to hold the sandpaper to the second surface 34 of the base member 14 but it should not be so strong as to prevent the soiled and/or used strip of sandpaper 50 from being removed and discarded. A fresh strip of sandpaper 50 can replace the worn out strip of sandpaper 50 that was removed. The grade of the sandpaper 50 that can be used can vary from coarse to fine, depending upon the amount of sanding that needs to occur.

Referring to FIG. 17, another embodiment is shown for attaching a strip of sandpaper 60 to a base member 14. In FIG. 17, the second surface 34 of the base member 14 has a hook material 58 secured to it. A strip of sandpaper 60, containing sand and/or some other abrasive material 52 on one major surface and a loop material 62 secured to an opposite major surface, is sized to mate with the base member 14. The loop material 62 is designed to engage the hook material 58 and securely hold the strip of sandpaper 60 to the second surface 34 of the base member 14. Once the sandpaper 60 is soiled and/or used up, the loop material 62 can be released from the hook material 58 and the soiled and/or used up strip of sandpaper 60 can be discarded. A fresh strip of sandpaper 60, also containing a loop material on one major surface, can then be attached to the hook material 58 which is present on the second surface 34 of the base member 14. The blocking tool 10 can then be used to sand a work surface on a vehicle.

The hook and loop material can be manufactured and purchased from Velcro USA, Inc. VELCRO is a registered trademark of Velcro USA, Inc. having an office located at 95 Sundial Avenue, Manchester, NH 03103. Alternatively, the hook and loop material can be purchased from some other company that manufactures and sells such materials.

Referring now to FIG. 18, a blocking tool 10 is shown in which a person grasps the hollow member 18 of the blocking tool 10 in one of his hands. The person's hand includes a palm having a thumb and four fingers attached thereto. The thumb is positioned on one side of the hollow member 18 and at least two of the four fingers are positioned on an opposite side of the hollow member 18. All four fingers can be positioned on the opposite side, if desired. The hollow member 18 serves as a handle which allows the blocking tool 10 to be positioned on a work surface 64 and be moved very easily. By sizing the hollow member 18 to have about a 1.5 inch or greater outside diameter d, the hollow member 18 can fit into the palm of most people hands. A hollow member 18 of this size can be moved on the work surface 64 in a comfortable manner.

The person could be a body shop mechanic. The body shop mechanic can grasp the hollow member 18 of the blocking tool 10 with either one of his hands. The person can move the blocking tool 10 back and forth, in a circular motion, and/or in a reciprocating motion to sand the work surface 64. By "reciprocate" it is meant to move back and forth alternately. The work surface 64 can be at least a portion of the exterior surface of a vehicle or some other article. Alternatively, the work surface 64 could be the entire exterior surface of a vehicle or some other article.

Referring now to FIG. 19, for a larger size blocking tool 10 or for a longer blocking tool 10, a person can grasp the hollow member 18 of the blocking tool 10 with both of his hands. In this situation, his two hands should be spaced apart from one another to evenly distribute the weight of the blocking tool 10.

The person could be a body shop mechanic. The body shop mechanic can grasp the hollow member 18 of the blocking tool 10 with both of his hands and move the blocking tool 10 back and forth, in a circular motion, and/or in a reciprocating motion to sand a work surface 64. The work surface 64 can be at least a portion of the exterior surface of a vehicle or some other article. Alternatively, the work surface 64 could be the entire exterior surface of a vehicle or some other article. By grasping the hollow member 18 in the palms of both of his hands, the person can sand the work surface 64 in a comfortable manner.

A rigid or a semi-rigid blocking tool 10 can be used to sand a surface flat. A more flexible blocking tool 10 can be used to uniformly sand a curved surface, a concave surface, a convex surface, etc. while maintaining a constant shape or constant round. By "constant round" it is meant following the curvature of the work surface 64.

Method

A method of using the blocking tool 10 will now be explained. The method utilizes a blocking tool 10 which includes a hollow member 18 having a length l, an inner periphery 20, an outer periphery 22, and a wall 24 formed between the inner and outer peripheries, 20 and 22 respectively. The hollow member 18 has a plurality of cuts 26 formed therein. The plurality of cuts 26 extend over at least about 70% of the length l, and each of the plurality of cuts 26 penetrates the wall 24 through an arc of at least about 60% of the outer periphery 22.

The blocking tool 10 also includes a base member 14 having a length $l_1$ and a width w. The length $l_1$ is equal to the length l of the hollow member 18 and the width w is greater than the maximum dimension of the outer periphery 22. When the hollow member 18 has a round or circular profile, the width w of the base member 14 is greater than the diameter d of the hollow member 18.

The base member 14 also has a first surface 32, an oppositely aligned second surface 34, and a thickness $t_3$ formed there between. A portion of the wall 24 of the hollow member 18 is secured to the first surface 32 of the base member 14. This securement can be accomplished using solvent welding, solvent bonding, solvent cementing or by a mechanical or chemical attachment known to those skilled in the art. A set of blocking tools 10 can be used wherein each blocking tool has a different degree of rigidity or flexibility so as to accommodate various contour in a work surface.

The method includes the steps of attaching a strip of sandpaper 50 to the second surface 34 of the base member 14. The sandpaper 50 can be attached to the second surface 34 of the base member 14 with a removable adhesive 54. Alternatively, the sandpaper 50 can be attached to the second surface 34 of the base member 14 using a hook 58 and loop 62 attachment. A person then grasps the hollow member 18 in one of his hands. His hand includes a palm having a thumb and four fingers. The thumb is positioned on one side of the hollow member 18 and at least two of the four fingers are positioned on an opposite side of the hollow member 18. The blocking tool 10 is then positioned on a work surface 64 which needs to be made smooth, such as an exterior surface of a vehicle or some other article. The blocking tool 10 is then moved in a desired motion by the person so that the work surface 64 can be sanded.

It should be noted that for a larger size blocking tool 10, a person can grasp the blocking tool 10 with both of his hands. In this situation, both of his hands should be spaced apart from one another to properly balance and move the blocking tool 10 in a comfortable manner.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A blocking tool comprising;
   a) a first member having a length and having an outer periphery with one or more cuts formed therein which extend over at least about 70% of said length, and each of said one or more cuts penetrates said first member through an arc of at least about 60% of said outer periphery; and
   b) a base member having a first surface, an oppositely aligned second surface, and a length, and a portion of said outer periphery of said first member is secured to said first surface of said base member to form an integral blocking tool, wherein said first member is a hollow member having an inner periphery and a wall formed between said inner periphery and said outer periphery, and a portion of said wall is secured to said first surface of said base member.

2. The blocking tool of claim 1, wherein said blocking tool is formed from a thermoplastic material.

3. The blocking tool of claim 2, wherein said first member and said base member are constructed of the same material.

4. The blocking tool of claim 1, wherein each of said one or more cuts penetrates said first member through an arc of at least about 70% of said outer periphery and the portion of said wall is secured to said first surface of said base member by solvent welding, solvent bonding or solvent cementing.

5. The blocking tool of claim 2, wherein said first member is formed from polycarbonate and has an outside diameter which ranges from between about 1 inch to about 4 inches, and has a wall thickness which ranges from between about 0.05 inches to about 1 inch, and said base member is formed from polycarbonate.

6. The blocking tool of claim 1, wherein said first member is a hollow cylindrical member having an outside diameter, and said base member has a rectangular configuration with a width which is greater than said outside diameter of said hollow cylindrical member.

7. The blocking tool of claim 6, wherein said outside diameter of said hollow cylindrical member ranges from between about 2 inches to about 3.5 inches, and said hollow cylindrical member has a length which ranges from between about 6 inches to about 48 inches.

8. The blocking tool of claim 1, wherein the one or more cuts of said first member comprises a plurality of cuts and said plurality of cuts are equally spaced apart from one another, and said plurality of cuts extend over at least about 80% of said length of said first member.

9. The blocking tool of claim 1, wherein said first member has an open first end and an open second end, and said base member is wider than said first member.

10. A blocking tool comprising;
a) a hollow cylindrical member having a length of at least about 6 inches, and having an inner periphery, an outer periphery, and a wall formed between said inner and outer peripheries, said hollow cylindrical member having a plurality of cuts formed therein which extend over at least about 75% of said length, and each of said cuts penetrates said wall through an arc of at least about 60% of said outer periphery; and
b) a base member having a length and a width, said length is equal to said length of said hollow cylindrical member, said width being greater than said outer periphery of said hollow cylindrical member, said base member having a first surface and an oppositely aligned second surface, and a portion of said wall of said hollow cylindrical member is secured to said first surface of said base member to form an integral blocking tool.

11. The blocking tool of claim 10, wherein said base member has a rectangular configuration and has rounded corners.

12. The blocking tool of claim 11, wherein said hollow cylindrical member has a flat surface on a portion of its outer periphery, said first surface of said base member is planar, and said flat surface is secured to first surface of said base member by solvent welding, solvent bonding or solvent cementing.

13. The blocking tool of claim 10, wherein said first surface of said base member contains a concave surface which is sized to match a portion of said outer periphery of said hollow cylindrical member, and a portion of said outer periphery of said hollow cylindrical member is positioned in said concave surface and is secured thereto by solvent welding, solvent bonding or solvent cementing.

14. The blocking tool of claim 10, further comprising a hook material secured to said second surface of said base member, said hook material engaging with sandpaper having a loop material secured to a major surface thereof, and engagement of said hook and loop materials secures said sandpaper to said base member of said blocking tool.

15. The blocking tool of claim 10, wherein a hook material is secured to said second surface of said base member by an adhesive.

16. The blocking tool of claim 10, wherein said hollow cylindrical member has an open first end and an open second end, at least two of said plurality of cuts formed in said hollow cylindrical member are randomly spaced apart from one another, and said plurality of cuts extend along at least about 90% of said length of said hollow cylindrical member.

17. A method of using a blocking tool, said blocking tool including a hollow member having a length, an inner periphery, an outer periphery, and a wall formed between said inner and outer peripheries, and said hollow member having a plurality of cuts formed therein which extend over at least about 70% of said length, and each of said cuts penetrates said wall through an arc of at least about 60% of said outer periphery; and a base member having a length and a width, said length is equal to said length of said hollow member and said width is greater than a maximum dimension of said outer periphery, said base member having a first surface, an oppositely aligned second surface, and a thickness formed there between, and a portion of said wall of said hollow member is secured to first surface of said base member, said method comprising the steps of:
a) attaching a strip of sandpaper to said second surface of said base member;
b) grasping said hollow member of said blocking tool with one hand, said hand having a palm with a thumb and four fingers attached thereto, said thumb positioned on one side of said hollow member and at least two of said four fingers positioned on an opposite side of said hollow member;
c) positioning said blocking tool on a work surface which needs to be made smooth with said sandpaper contacting said work surface; and
d) moving said blocking tool in a desired motion to sand said work surface.

18. The method of claim 17, wherein said sandpaper is attached to said second surface of said base member with an adhesive.

19. The method of claim 17, wherein said sandpaper is attached to said second surface of said base member using a hook and loop attachment.

20. The method of claim 17, further comprising grasping said hollow member of said blocking tool with both hands, and said hands being spaced apart from one another.

* * * * *